United States Patent [19]

Minamitani

[11] 4,279,176
[45] Jul. 21, 1981

[54] LOCKING DEVICE FOR A TILT STEERING WHEEL

[75] Inventor: Fumio Minamitani, Yokohama, Japan

[73] Assignee: Isuzu Motors Ltd., Tokyo, Japan

[21] Appl. No.: 99,794

[22] Filed: Dec. 3, 1979

[30] Foreign Application Priority Data

Dec. 8, 1978 [JP] Japan .................................. 53-150985
Jul. 3, 1979 [JP] Japan .................................... 54-83413

[51] Int. Cl.³ .......................... B62D 1/18; G05G 5/06
[52] U.S. Cl. ......................................... 74/493; 74/527; 403/96; 403/324
[58] Field of Search .................. 74/493, 527; 297/364; 403/92, 93, 96, 322, 324, 328

[56] References Cited

U.S. PATENT DOCUMENTS

| | | | |
|---|---|---|---|
| 2,830,464 | 4/1958 | Winterbauer | 74/493 X |
| 3,395,930 | 8/1968 | Morgan | 74/493 X |
| 3,691,866 | 9/1972 | Berkes | 74/493 |

*Primary Examiner*—Allan D. Herrmann
*Attorney, Agent, or Firm*—John E. Toupal

[57] ABSTRACT

A locking device for a tilt steering wheel in which a first bracket is mounted on an end of a steering column secured on a vehicle body, a second bracket rotatably supporting a steering wheel shaft is pivotally connected to the first bracket and a wheel drive shaft is connected to the steering shaft by a universal joint. The locking device comprises an adjusting plate for adjusting the tilt angle of the steering wheel and pivotally supported by the second bracket, an operating member supported by the adjusting plate and capable of being projected against a spring toward a rotatable portion of the second bracket, a detent mechanism composed of depressions disposed in arcuately spaced apart positions in the rotatable portion and balls placed in resilient engagement with the depressions to maintain the rotational position of the adjusting plate, a plurality of pin holes bored in one of the brackets to receive therein first pins in spaced relation of the adjusting plate, and other pin holes bored in the other of the pair of brackets to receive therein second pins placed in abutment with the first pins by means of springs, whereby the second pins are entered into one of the pin holes for the first pins to lock the relative rotational position of the pair of brackets, the movement of the operating member in an axial direction causes the second pin to be moved away by the first pin to allow the relative rotation of the pair of brackets, and the adjusting plate may be rotated to set a desired relative rotational position.

6 Claims, 12 Drawing Figures

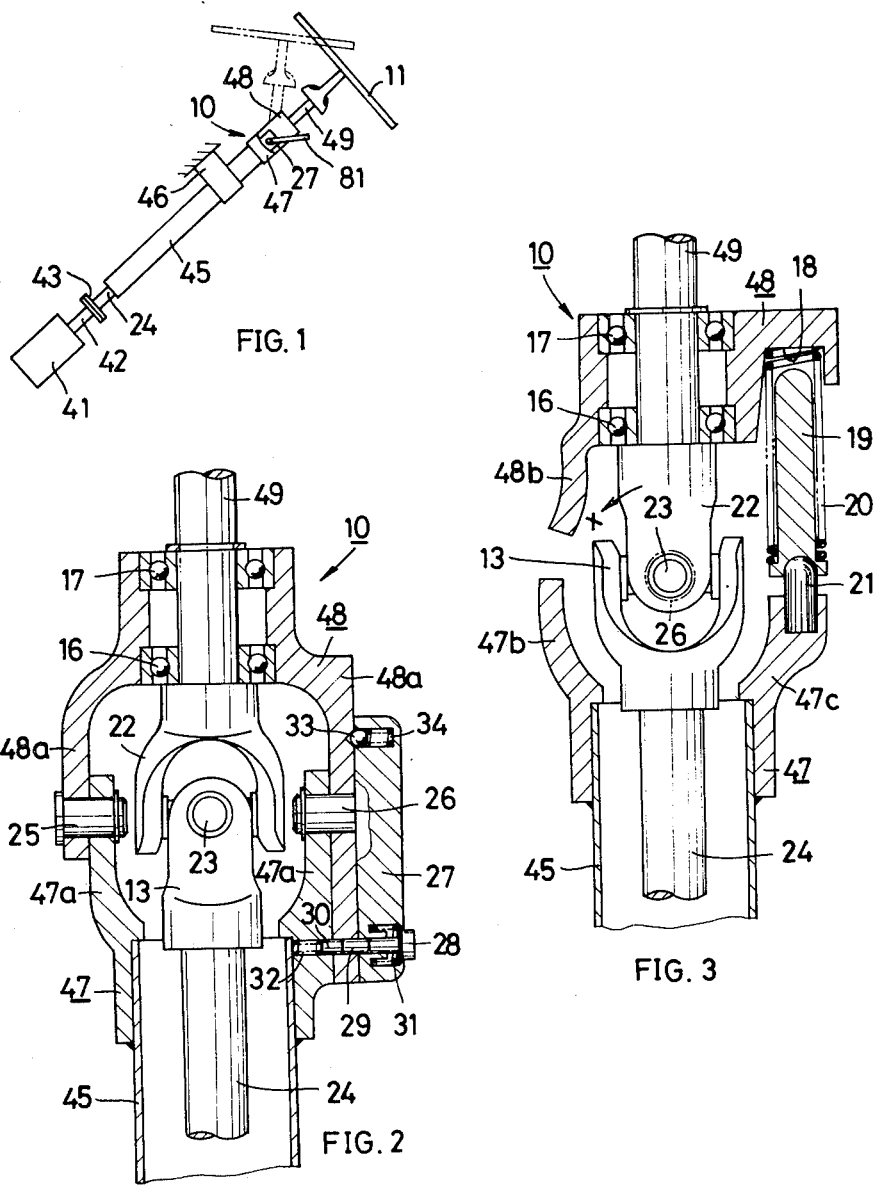

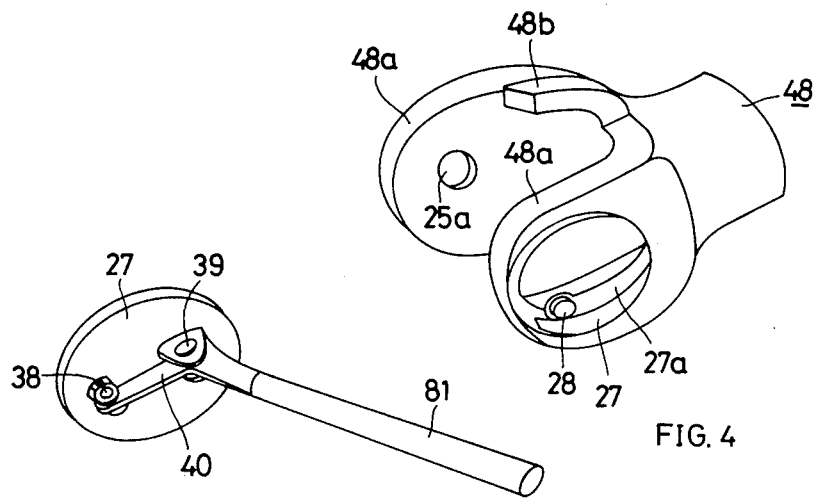
FIG. 4
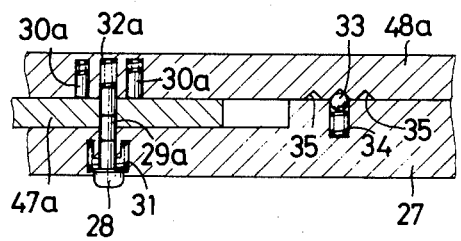
FIG. 6
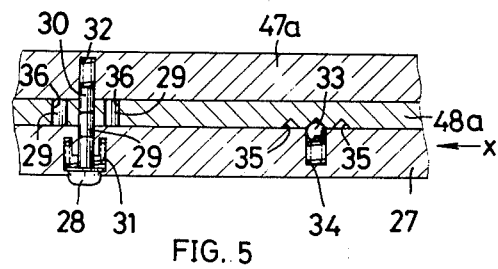
FIG. 5
FIG. 7

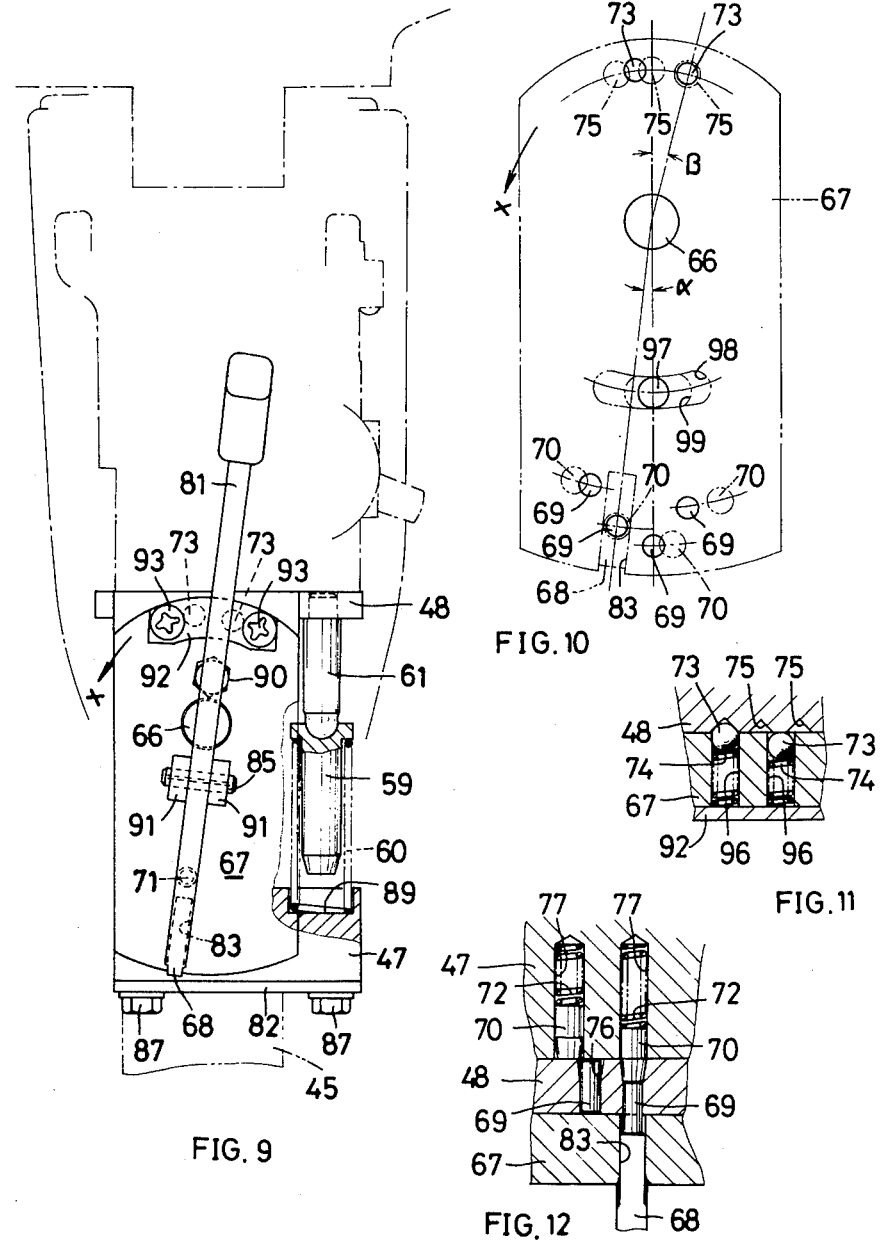

LOCKING DEVICE FOR A TILT STEERING WHEEL

BACKGROUND OF THE INVENTION

The present invention relates to a locking device for a tilt steering wheel in which a wheel shaft and a shaft connected to a steering gear mechanism are connected pivotally so that the steering wheel may be raised or lowered into either a position suitable for driving or into a position for making it easier for the driver to get into or out of the car.

It is a principal object of the present invention to provide for a tilt steering wheel a locking device that returns a steering wheel from a tilt-up position to an originally set position for driving.

SUMMARY OF THE INVENTION

In the preferred embodiment of this invention, there is provided a locking device for a tilt steering wheel in which a first bracket is mounted on the end of a steering column secured to a vehicle body, a second bracket rotatably supporting a steering wheel shaft is pivotally connected to the first bracket and a wheel drive shaft is connected to the steering shaft by a universal joint. The device comprises an adjusting plate for adjusting the tilt of the steering wheel, and being rotatably supported on the second bracket, an operating pin supported on a peripheral edge portion of the adjusting plate and capable of being projected against a spring toward a rotatable portion of the second bracket, a detent mechanism composed of depressions disposed in arcuately spaced positions on the rotatable portion and balls placed in resilient engagement with the depressions to maintain the rotational position of the adjusting plate, a plurality of pin holes bored in one of the pair of brackets to receive therein first pins in spaced relation of said adjusting plate, and other pin holes bored in the other of the pair of brackets to receive therein second pins placed in abutment with the first pins by means of springs, whereby the second pins are entered into one of the pin holes for the first pins to lock the relative rotational position of the pair of brackets, the axial movement of the operating pin of the adjusting plate causes the second pin to be moved away by the first pin to allow the relative rotation of the pair of brackets, and the adjusting plate may be rotated to set a suitable relative rotational position.

According to a feature of the invention, the positions of the locking device for a tilt steering wheel preferably comprises a bracket for rotatably supporting a steering wheel shaft, a second bracket secured to a steering column and an adjusting plate are relatively rotatable and slidably connected by means of pins, joining or coupling pins join the first and second brackets in their rotating and sliding portion, setting storage pins for joining the first bracket and the adjusting plate at their rotating and sliding portion, an operating pin supported on said adjusting plate to release the setting engageable means including grooves disposed in circumferentially spaced relation on the portion between said first bracket and said adjusting plate to adjust the relative rotational position thereof and balls placed in resilient engagement with said grooves, characterized in that a plurality of ones of said joining pins and said first and second pins correspond to the positions of the engageable depressions. With this arrangement, the operating pin merely need be pressed to release respective engagement of the pins so that the steering wheel may be tilted up to make it easier for a driver to get into or out of the car. Subsequently, the wheel merely need be pushed down so that it may be locked to its original set position. With the adjusting plate rotated into the aforementioned tilted position, a new position of the pins for coupling the pair of brackets may be selected to obtain a suitable angle of steering wheel inclination.

BRIEF DESCRIPTION OF THE DRAWINGS

The objects and features of the present invention will become apparent upon consideration of the following detailed description and the accompanying drawings, in which:

FIG. 1 is a side view schematically illustrating a locking device for a tilt steering wheel in accordance with the present invention;

FIG. 2 is a horizontal sectional view of the locking device;

FIG. 3 is a sectional view taken orthogonally to the view of FIG. 2;

FIG. 4 is a perspective view of a bracket of the locking device shown in FIG. 3;

FIG. 5 is a detailed sectional view of a portion of the locking device shown in FIG. 5;

FIG. 6 is a perspective view showing a modified embodiment of the locking device;

FIG. 7 is a detailed sectional view similar to FIG. 5 of a modified form in accordance with the present invention;

FIG. 9 is a sectional view showing the side of the locking device of FIG. 8;

FIG. 10 is a diagrammatic side view of the device showing the relationship between individual components;

FIG. 11 is a detailed sectional view showing engageable means of the invention; and FIG. 12 is a detailed sectional view showing the relationship between certain components in a peripherally developed form.

DESCRIPTION OF THE PREFERRED EMBODIMENTS

Figure 8:
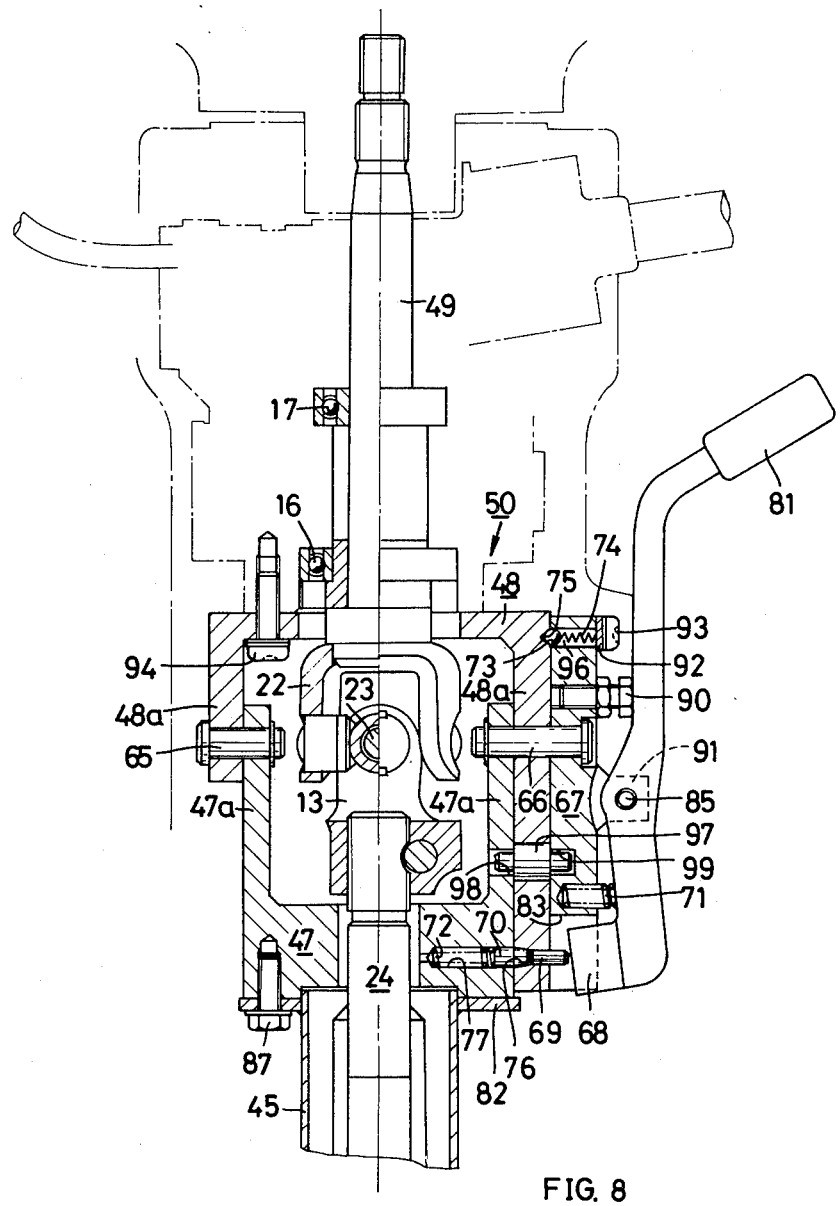
FIG. 8 is a horizontal sectional view of the locking device.

Referring now to the drawings, FIG. 1 illustrates a steering mechanism utilizing the invention. A steering gear mechanism 41 is connected to the lower end of an intermediate shaft 24 by a shaft coupling 43. The intermediate shaft 24 is rotatably supported by a steering column 45 secured to a vehicle body (not shown) by mounting device 46. A bracket 47 is secured to the upper end of the steering column 45 and is coupled to a mating bracket 48. Rotatably supported by the bracket 48 is a shaft 49 of a steering wheel 11. As described hereinafter, the shaft 49 and steering wheel 11 can be raised or lowered as indicated by dash-dotted lines relative to the bracket 47.

As shown in FIGS. 2 and 3, the upper end of the intermediate shaft 24 is connected to the lower end of the steering shaft 49 by a universal joint 23.

A locking device 10 locks the bracket 48 in a selected angular position with respect to the shaft 24. The bracket 47 has bifurcated connection portions 47a at an upper end thereof. Similarly the bracket 48 that supports the shaft 49 via bearings 16, 17 has bifurcated connection portions 48a at a lower end thereof. The connection portions 48a overlap the connection portions 47a and are connected thereto by pivot pins 25 and 26. A bifurcated yoke 13 is mounted on the upper end of the intermediate shaft 24 and a bifurcated yoke 22 is mounted on the lower end of the steering shaft 49. These yokes 13, 22 are rotatably coupled with a universal joint 23.

An adjusting plate 27 with a ridge 27a (FIG. 4) is mounted on one of the leg portions and is rotatably supported on the pivot pin 26. Formed in that leg portion 48a are a plurality of arcuately spaced depressions 35 (FIG. 5). Accommodated by the depressions 35 are balls 33 retained in holes in the adjusting plate 27 and urged outwardly by springs 34.

As shown in FIG. 2, an operating pin 28 is slidably retained by the adjusting plate 27. A head portion of the operating pin 28 is biased outwardly by a spring 31. Aligned with the pin 28 are pin holes bored in the leg portions 48a and 47a. Inserted into these pin holes are a setting storage pin 29 and a connection pin 30 that rotatably fix the connection portions 47a and 48a. The length of the setting storage pin 29 is equal to the width of the connection portion 48a. A spring 32 urges engagement between the setting storage pin 29, the connection pin 30 and the operating pin 28.

As best shown in FIG. 3, the bracket 47 includes a thick wall support portion 47c located between the connection leg portions 47a. Retained by a recess in the support portion 47c is a pin 21. A rod 19 enclosed by a coiled spring 20 has one end supported by a recess 18 in the bracket 48. The opposite end of the rod 19 defines a semispherical depression that receives a spherical end of the rod 19 so that the rod 19 may be tilted with respect to the pin 21 while guiding the coiled spring 20.

Also defined by the bracket 47 opposite the portion 47c and between the leg portions 47a is a stop portion 47b. The bracket 48 has a projection portion 48b opposite to and aligned with the stop portion 47b. Thus, as indicated by dotted lines in FIG. 1, when the bracket 48 and supported wheel 11 are tilted upwardly about the pins 25 and 26 by the force of the spring 20, the projection portion 48a comes into abutment with the stop portion 47b.

As shown in FIG. 5, the above-mentioned pins 28 and 30 are aligned and sequentially engage one of a plurality of the storage pins 29 arcuately spaced in a circle about the pin 26. The arcuate spacing of the storage pins 29 corresponds to the spacing between the conical depressions 35. Thus, as the balls 33 sequentially engage the depressions 35 during rotation of the adjusting plate 27, the operating pin 28 is sequentially placed in alignment with the pin holes 36 of the storage pins 29.

When rotational restraint between the portions 47a and 48a is released, the bracket 48 is rotated about the pins 25 and 26 in a direction indicated by arrow x under the force of the coiled spring 20 as shown in FIG. 3. Such rotation stops when the projection portion 48b of the bracket 48 impinges upon the stop portion 47b of the bracket 47. That is, the bracket 48, the shaft 49 and the wheel 11 are tilted upwardly relative to the steering column 45 so that the wheel 11 assumes the position as indicated by the dotted lines as shown in FIG. 1, thus making it easier for the driver to get into or out of the car. In a state in which the wheel 11 is tilted up, the setting storage pins 29 are prevented from movement by engagement between the adjusting plate 27 and the wall surface of the connection portion 47a and therefore remains within the pin holes 36.

Next, when the driver wishes to return the wheel 11 to its original position for suitable mode of driving, the wheel handle 11 may merely be pushed down. That is, when the wheel 11 is pushed down, the bracket 48 is rotated about the pins 25 and 26 in a direction opposite the arrow x against the force of the spring 20. When a pin hole 36 of the central storage pin 29 comes into coincidence with the pin hole of the connection pin 30 held by the connection portion 47a, the connection pin 30 is urged into the pin hole 36 by the spring 32 to permit the storage pin 29 to engage the pin hole of the aligned operating pin 28.

OPERATION

With the wheel 11 positioned as shown in FIGS. 1, 2, 3 and 5, the connection pin 30 is urged partially into the pin hole 36 of the centrally located storage pin 29 by the force of the spring 32. Correspondingly, the storage pin 29 is forced from the hole 36 partially into the pin hole of the operating pin 28 so as to engage therewith. Also, the spring 34 forces the ball 33 into the centrally located depression 35 in the connection portion 48a. In this condition the connection pin 30 engages both the connection portions 47a and 48a so as to prevent rotation of the bracket 48 about the pivot pin 26. In addition, the storage pin 29 engages both the connection portion 48a and the adjusting plate 27 so as to prevent rotation of the adjusting plate 27 about the pin 26. Thus, the bracket 48 is locked to a selected inclination with respect to the bracket 47.

To facilitate either entry or exit from the car, a driver urges the head of the operating pin 28 against the force of the spring 31. This action forces the storage pin 29 out of the pin hole in the adjusting plate 27 and completely into the pin hole 36 in the connection portion 48a. Correspondingly, the connection pin 30 is forced completely into the pin hole in the connection portion 48a. Consequently, the connection portions 47a and 48a are released from mutual connection and the wheel 11 is moved by the spring 20 into the position shown by dotted lines in FIG. 1. However, the adjusting plate 27 remains rotationally fixed in the preselected position. Therefore, when the driver forces the wheel downwardly against the spring 20, the operating pin again enters the centrally located hole 36 to establish the previously selected wheel position.

If a different wheel position is desired, the operating pin 28 is pushed inwardly as mentioned above to tilt the wheel 11 upwardly. With the wheel 11 in that position, the storage pins 29 are maintained completely within the holes 36 in the connection portion 48a. Consequently, the adjusting plate 27 may be rotated about the pin 26 as the ball 33 is withdrawn from the centrally located depression 35 against the force of the spring 34. A new wheel inclination position is established when the ball 33 comes into engagement with another depression 35. For example, when a lower wheel operating position is desired, the adjusting plate 27 is rotated in a direction indicated by the arrow x (FIG. 5) until the ball 33 enters the left depression 35 of the connection portion 48a. Simultaneously, the operating pin 28 comes into alignment with the left storage pin 29. Subsequently, when the wheel 11 is forced downwardly, the connection portion 48a and the adjusting plate 27 are integrally rotated about the pin 26 in a direction against the arrow x (FIG. 3). When alignment is reached between the left storage pin 29 and the connection pin 30, the latter is urged into the pin hole 36 by the spring 32 and the former is urged into the pin hole of the adjusting plate 27. Thus, the wheel 11 cannot be further pushed down and the wheel 11 is set to the newly selected, lower tilted position. Conversely, if the steering wheel 11 is to be operated at a level slightly higher than the position shown in FIG. 1, the adjusting plate 27 is rotated in a direction opposite the arrow x (FIG. 5) until the ball 33 engages the right depression 35.

The above-described adjustments also can be accomplished without tilting the wheel 11 into the dotted position of FIG. 1. While holding the operating pin 28 inwardly to maintain the storage pin 29 completely within the hole 36, the adjusting plate 27 can be adjusted to the desired rotational position relative to the connection portion 48a by gently pushing the wheel 11 in the desired direction. Upon reaching a new position, the wheel 11 is locked when the connection pin 30 coincides with a selected storage pin 29. If a multitude of depressions 35 and pin holes 36 for receiving the storage pins 29 are disposed on an arc about the pin 26, it is possible to lock the wheel in a multitude of tilted positions. It will be appreciated that in an alternative structure the ball 33 may be disposed in the connection portion 48a and the depressions 35 may be disposed in the adjusting plate 27. In addition, instead of directly manually pushing the operating pin 28, there can be provided an arrangement as shown in FIG. 6. As shown, one end of a bell crank 40 carried by a pivot pin 39 is connected to the adjusting plate 27 by a pin 38 and engages the operating pin 28. Actuation of the operating pin 28 is produced by activation of an elongated lever 81 formed on the opposite end of the bell crank 40.

In the embodiments described above, the connection portion 48a of the movable bracket 48 and the adjusting plate 27 are both arranged externally of the connection portion 47a of the stationary bracket. FIG. 7 shows another embodiment in which the connection portion 48a of the movable bracket 48 and the adjusting plate 27 are arranged on opposite sides of the connection portion 47a of the stationary bracket 47. In this embodiment, engaging surfaces between the connection portion 48a and the adjusting plate 27 are provided respectively with depressions 35 and a ball 33 placed in engagement with the depressions 35 by means of a spring 34. The operating pin 28 biased outwardly by the spring 31 is carried by the adjusting plate 27 in a manner similar to that shown in the embodiments of FIGS. 2 and 5. However, a single setting storage pin 29a is disposed in the connection portion 47a, and a plurality of connection pins 30a biased by springs 32a are disposed in the connection portion 48a in given arcuately spaced relationships about the pin 26. As with the embodiment of FIG. 5, rotational adjustment positions of the adjusting plate 27 relative to the connection portion 48a is established by engagement between the ball 33 and the depressions 35. Again, when one of the connection pins 30a coincides with the pin 29a, the connection portion 48a is locked to the connection portion 47a by that connection pin 30a and a desired wheel inclination is attained.

It should be understood in the embodiments described above that the bracket 47 may be secured alternatively to the steering shaft 49 and the bracket 48 may be secured to the steering column 45. It should be further noted that the adjusting plate 27, the connection portion 48a of the bracket 48 and the connection portion 47a of the bracket 47 are coaxially arranged, and in the peripheral surface in which they are rotated and slidably moved about the pin 26, the pins 28, 29 and 30 are disposed in a radial direction.

SECOND EMBODIMENT

Another embodiment device 50 for locking the bracket 48 in a suitable tilt is constructed as shown in FIG. 8. Components similar to those described above bear identical reference numbers. A flange 82 is secured to the upper end of the steering column 45 by, for example, welding and a bracket 47 having bifurcated connection portions 47a is secured to the flange 82 by a bolt 87. A bracket 48 having bifurcated connection portions 48a is secured by means of a bolt 94 to an upper column (not shown) for supporting a steering wheel shaft 49 on bearings 17 and 16. The connection portions 47a are positioned within the connection portion 48a and are connected rotatably thereto by aligned pivot pins 65 and 66. A bifurcated yoke 13 is secured to the upper end of an intermediate shaft 24. Connected to the yoke 13 by a universal joint 23 is a bifurcated yoke 22 secured to the lower end of a steering shaft 49. The connection portions 47a and 48a of the brackets 48, 47, respectively, are positioned to overlap each other along a flat surface and an adjusting plate 67 overlaps the outer surface of the connection portion 48a and is connected rotatably by means of the pivot pin 66. Provided in the adjusting plate 67 and the connection portion 48a are engageable means for selectively fixing the relative rotational positions thereof.

These means include a plurality of conical depressions 75 formed in a surface of the connection portion 48a in arcuately spaced relationship about the pivot pin 66. Also included is a pair of balls 73 engageable with the depressions 75 and received by pin holes 96 bored in the adjusting plate 67. The balls 73 biased outwardly by springs 74 disposed between the balls and a retaining plate 92 that closes the holes 96. As may be seen in FIG. 10, the pair of balls 73 are arranged with a space $1\frac{1}{2}$ times that of the spacing between the depressions 75. The retaining plate 92 is secured to the outer surface of the adjusting plate 67 by bolts 93. To limit the relative rotational positions between the brackets 47, 48 and the adjusting plate 67, a central portion of a pin 97 is secured to the connection portion 48a of the bracket 48. One end of the pin 97 is engaged by a circular groove in the connection portion 47a while the other end thereof is engaged by a circular groove 99 formed in the inner surface of the adjusting plate 67.

To maintain a desired inclination of the bracket 48 with respect to the bracket 47, the bracket 47 has pin holes 77 oriented perpendicular to the engaging sliding surfaces between the brackets 47 and 48. The pin holes 77 receive connection pins 70 biased toward the connection portion 48a by a spring 72. The right end of the connection pins 70 (FIG. 8) are tapered and similarly tapered pin holes 76 are bored in the connection portion 48a. Engagement between the connection pins 70 and the pin holes 76 maintain the relative rotational positions therebetween.

A setting storage pin 69 having a length equal to the width of the connection portion 48a is received by each of the pin holes 76 and can be activated to force a connection pin 70 out of a pin hole 76. Activation of a storage pin 69 is provided by an operation body 68 facing a split recess 83 in the adjusting plate 67. The operating body 68 is formed on one end of an operating lever 81 that is rotatably supported by a pin 85 between a pair of brackets 91 disposed on the outer surface of the adjusting plate 67. The operating lever 81 is normally biased outwardly from the split recess 83 by a spring 71 retained by the adjusting plate 67. This outward movement is limited by a stop bolt 90 threadably secured to the adjusting plate 67.

As may be seen in FIG. 10, the aforementioned plurality of connection pins 70 are disposed in arcuately spaced relationship about the pivot pin 66 and at different radial distances therefrom. Also, the plurality of pin holes 76 and the setting storage pins 69 received therein are arranged on the same arcs and at the same radial distances as the connection pins 70. The rotational angle between adjacent setting storage pins 69 is equal to half of the rotational angle B between adjacent depressions 75.

As shown in FIG. 9, the bracket 47 is formed with a recess 89 that accommodates one end of a coiled spring 60. The other end of the spring 60 is retained by an end flange of a rod 59 that is received by and restrains curving of the spring 60. The rod 59 has an end formed with a spherical depression that is engaged by the spherical end of a pin 61 secured to the bracket 48. In a state where the connection pins 70 for controlling the relative rotational positions between the bracket 47 and the bracket 48 are released, the bracket 48 tilts upwardly as shown by dotted lines in FIG. 1. This movement occurs about the pivot pins 65 and 66 in response to the force of the spring 60. During this movement, the pin 97 (FIG. 8 and 10) in the bracket 48 bears on the circular groove 98 of the bracket 47 to restrict the rotational angle.

OPERATION OF SECOND EMBODIMENT

When the wheel 11 is positioned as shown by the solid lines in FIG. 1, the right-hand ball 73 engages the right depression 75 (FIG. 10) and the second from the left connection pin 70 engages a pin hole 76 on an arc corresponding thereto to bear on a setting storage pin 69. The split recess 83 in the adjusting plate 67 is in registration with these connection and storage pins 69 and 70. As shown in FIG. 12, the connection pin 70 has a tapered end portion that registers with the tapered portion of the pin hole 76. In response to the bias of the spring 72, the connection pin 70 forces the storage pin 69 out of the pin hole 76 and against the operating body 68. The lever 81 is prevented from counterclockwise rotation by the stopper bolt 90 (FIG. 8) so that the storage pin 69 is retained by the body 68. Also, the right-hand half portion of the pin hole 76 is fitted to the outside diameter of the storage pin 69 so as to restrict play therebetween. Similarly, the connection pin 70 also is fitted to the pin hole 76 so as to minimize play between the brackets 47 and 48. In this condition, the connection pin 70 locks the connection portions 47a and 48a to prevent rotation of the latter about the pivot pin 66. At the same time, the storage pin 69 engages the connection portion 48a and adjusting plate 67 to prevent rotation thereof about the pivot pin 66.

When a driver enters or exits from a car, the operating lever 81 is rotated clockwise about the pin 85 (FIG. 8). This causes the body 68 to force the storage pin 69 into the pin hole 76 of the connection portion 48a and in turn the connection pin 70 is forced into the pin hole 77 against the spring 72. With the operating body 68 bearing on the surface of the connection portion 48a, the pin 70 is completely out of the hole 76 and rotational connection between the brackets 47 and 48 is released. However, the adjusting plate 67 remains fixed in position relative to the connection portion 48a because of the engagement between the ball 73 and the depression 75. With the connection between the bracket 47 and the bracket 48 released, the latter is rotated by the spring 60 in a direction about the pivot pins 65 and 66 indicated by the arrow x (FIG. 9). This rotation terminates when the pin 97 supported by the bracket 48a engages the end of the circular recess 98 in the bracket 47 (FIG. 10). Thus, the bracket 48, the steering shaft 49 and the wheel 11 are tilted up with respect to the steering column 45, as shown by the dotted lines in FIG. 1. During the movement of the bracket 48, the adjusting plate 67 remains fixed to the bracket 48 by engagement between the ball 73 and the depression 75. Therefore, the storage pins 69 are confined by the adjusting plate 67 even during registration between one of the storage pins 69 and a connection pin 70. For this reason none of the connection pins are permitted to enter a hole 76 and create a connection between the brackets 47 and 48.

When the driver wishes to return the wheel 11 to its original operating position for driving, the wheel 11 is pushed downwardly to rotate the bracket 48 in a direction opposite the arrow x (FIG. 9) against the force of the spring 60. This movement persists until the storage pin 69 is aligned with the split recess 83; i.e., the second storage pin 69 from the left in FIG. 10 coincides with the connection pin 70 lying on the same arc. At that time, that connection pin 70 is projected into the aligned pin hole 76 by the spring 72 and the storage pin 69 is projected into the split recess 83 to assume the original position shown in FIG. 9. The wheel 11 cannot then be further moved and is locked in its original operation position.

In the event that a different operating tilt is desired for the wheel 11, the storage pin 69 is pushed in by activation of the operating lever 81. This causes the wheel to move into the fully upward position as previously described. In that position all storage pins 69 are forced into the pin holes 76 and the adjusting plate 67 may be rotated about the first pin 66. For example, when a more elevated operating position is desired, the adjusting plate 67 is slightly rotated in the direction of arrow x (FIG. 10). This movement disengages the right ball 73 from the right depression 75 and engages the left ball 73 with the left depression 75. The adjusting plate is moved relative to the portion 48a through half the spacing between the depressions 75, and the split recess 83 coincides with the third storage pin 69 from the left as viewed in FIG. 10. Subsequently, when the wheel 11 is pushed downwardly, the connection portion 48a and adjusting plate 67 are integrally rotated about the pivot pin 66 in a direction opposite to the arrow x until the third storage pin 69 from the left coincides with the third connection pin 70 from the left. At that time the connection pin 70 is forced into the split recess 83 to impinge upon the operating body 68. Accordingly, the wheel 11 cannot be further moved and is locked in the newly selected operating position.

Conversely, when a less elevated operating wheel position is desired, the adjusting plate 67 is rotated in a direction opposite to the arrow x (FIG. 10). The split recess 83 of the adjusting plate 67 is caused to coincide with the storage pin 69 at the far left. Thereafter, that pin registers with the connection pin 70 at the far left when the wheel 11 is moved downwardly as described above.

As with the embodiment of FIGS. 1–5, operational position adjustment can be accomplished without releasing the wheel to its fully upward position. If the connection pin 70 is released by the operating lever 81, the adjusting plate 67 can be rotated relative to the connection portion 48a by gently moving the wheel 11 to a newly desired position. The wheel 11 is locked in a new position when a connection pin 70 coincides with a newly selected storage pin 69.

Since the connection pins 70 for fixing the rotational position of the bracket 48 with respect to the bracket 47 are disposed at the different distance from the pivot pin 66 of the bracket 48, it is possible to reduce the angular spacing therebetween. Consequently, a greater variety of operating wheel positions is possible. To accommodate this feature, the adjusting plate 67 is provided with the split recess 83 that extends radially from the pivot pin 66. Consequently, storage pins 69 arranged at different distances from the pivot pin 66 can register with the split recess 83 which has a width larger than the diameter of the storage pins 69. Also, since the operating body 68 has an abutting surface of sufficient width with respect to the storage pins 69, the rotational operation of the adjusting plate 67 allows the split recess 83 and the storage pins 69 to easily coincide with each other. Thus, the releasing action of the storage pins 69 may be carried out smoothly. The larger width of the operating body 68 also insures registration with the storage pins 69 despite slight errors in the position of engagement between the depressions 75 and the balls 73.

Because of their tapered ends, the connection pins 70 smoothly engage the pin holes 76 in the bracket 48 when the wheel 11 is returned from an upwardly tilted to a driving position. In addition, the tapered portions of the connection pins 70 mate with the tapered portions of the pin holes 76 so as to be firmly engaged thereby. For this reason, the wheel 11 is fixed without play in a desired operating position.

The foregoing description presents the preferred embodiments of this invention. Modifications and alterations may occur to those skilled in the art which will come within the scope and spirit of the following claims.

What is claimed is:

1. A locking device for a tilt steering wheel in which an intermediate shaft connected to a steering gear mechanism and a wheel shaft are linked together by means of a universal joint, and at said linked position, a first bracket for rotatably supporting said wheel shaft and a second bracket secured to a steering column are pivotally joined by a pair of pivot pins, said device comprising:

an adjusting plate rotatably and slidably supported on said first bracket by one of said pivot pins;

connection pin means for connecting said first and second brackets so as to prevent relative rotation therebetween;

setting storage pin means for connecting said bracket and said adjusting plate so as to prevent rotation therebetween;

an operating body means for releasing said setting storage pin means from said adjusting plate;

springs for biasing said connection pin means toward a position in which said first and second brackets are connected;

retaining means for restricting relative rotation between said adjusting plate and said first bracket; said retaining means adapted to retain said adjusting plate in a plurality of positions relative to said first bracket; and said connection pin means and said setting storage pin means being arranged for sequential axial registration in each of said relative positions and whereby said connection pin means are released from the force of said springs by axial motion of said operating body means in said positions in which said operating body means, said setting storage pin means and said connection pin means are in axial registration.

2. A locking device according to claim 1, wherein said retaining means comprises a plurality of conical depressions provided on one of said first bracket and said adjusting plate, ball means retained by the other of said first bracket and said adjusting plate, and spring means for sequentially urging said ball means into one of said depressions.

3. A locking device according to claim 1, wherein said operating body includes operating pin means slidably retained by hole defining means in said adjusting plate, and said operating means is movable between positions in which a portion of said setting storage pin means is received into said hole defining means and positions in which said setting storage pin means is completely expelled out of said hole defining means.

4. A locking device according to claim 1 wherein said connection pin means comprises ends tapered towards said adjusting plate, and said first bracket defines pin holes tapered in correspondence to said tapered ends.

5. A locking device according to claim 1 wherein said connection pin means comprise a plurality of connection pins disposed on arcs of different radius about said pivot pin supporting said adjusting plate.

6. A locking device according to claim 5 wherein said retaining means comprises a plurality of depressions spaced apart a given distance on an arc about said pivot pin by supporting said adjusting plate, and a plurality of balls spaced apart on said arc by a uniform distance $1\frac{1}{2}$ times said given distance.

* * * * *